United States Patent
Bußer et al.

(10) Patent No.: US 9,674,216 B2
(45) Date of Patent: Jun. 6, 2017

(54) TESTING INTEGRITY OF PROPERTY DATA OF A DEVICE USING A TESTING DEVICE

(71) Applicant: SIEMENS AKTIENGESELLSCHAFT, München (DE)

(72) Inventors: Jens-Uwe Bußer, Neubiberg (DE); Kai Fischer, Baldham (DE)

(73) Assignee: Siemens Aktiengesellschaft, München (DE)

( * ) Notice: Subject to any disclaimer, the term of this patent is extended or adjusted under 35 U.S.C. 154(b) by 15 days.

(21) Appl. No.: 14/432,203

(22) PCT Filed: Aug. 8, 2013

(86) PCT No.: PCT/EP2013/066648
§ 371 (c)(1),
(2) Date: Mar. 30, 2015

(87) PCT Pub. No.: WO2014/048630
PCT Pub. Date: Apr. 3, 2014

(65) Prior Publication Data
US 2015/0264080 A1 Sep. 17, 2015

(30) Foreign Application Priority Data

Sep. 28, 2012 (DE) .......... 10 2012 217 743

(51) Int. Cl.
*H04L 29/06* (2006.01)
*G06F 21/56* (2013.01)
(Continued)

(52) U.S. Cl.
CPC .... *H04L 63/1458* (2013.01); *G06F 17/30371* (2013.01); *G06F 21/565* (2013.01);
(Continued)

(58) Field of Classification Search
CPC .......... G06F 2221/2103; G06F 21/565; G06F 21/64; G06F 2221/033; H04L 63/12; H04L 9/3271; H04L 9/32; H04L 9/3236
See application file for complete search history.

(56) References Cited

U.S. PATENT DOCUMENTS

| 6,988,250 | B1 * | 1/2006 | Proudler | ................ G06F 21/34 705/50 |
| 7,444,561 | B2 * | 10/2008 | Korkishko | ............. G06F 11/08 714/718 |

(Continued)

FOREIGN PATENT DOCUMENTS

| CN | 101772770 A | 7/2010 |
| DE | 102007034525 A1 | 1/2009 |

(Continued)

OTHER PUBLICATIONS

German Office action for related German Application No. 10 2012 217 743.4, dated Jun. 4, 2013, with English Translation.

(Continued)

*Primary Examiner* — Farid Homayounmehr
*Assistant Examiner* — Christopher C Harris
(74) *Attorney, Agent, or Firm* — Lempia Summerfield Katz LLC

(57) ABSTRACT

The embodiments relate to a method and a test system for testing integrity of property data of a device using a testing device within a network, the devices and their respective property data within the network, such as all the measurement or control device distributed inside an industrial automation system, being taken into account in order to simplify testing of a large number of devices. The various property data are tested for an identity and are labelled, and calculations, which are carried out by the testing device for testing purposes, are initiated on the basis of the labelling. By taking other devices in the system into account, security require- (Continued)

ments may be fulfilled during testing and the computational effort for the testing device may also be reduced.

6 Claims, 3 Drawing Sheets

(51) Int. Cl.
    *G06F 21/64*    (2013.01)
    *G06F 21/57*    (2013.01)
    *G06F 17/30*    (2006.01)

(52) U.S. Cl.
    CPC .............. *G06F 21/57* (2013.01); *G06F 21/64* (2013.01); *H04L 63/1416* (2013.01); *G06F 2221/033* (2013.01)

(56) References Cited

U.S. PATENT DOCUMENTS

| | | | |
|---|---|---|---|
| 8,683,219 B2 | 3/2014 | Bußer et al. | |
| 2002/0138554 A1* | 9/2002 | Feigen | H04L 63/123 709/203 |
| 2003/0065956 A1* | 4/2003 | Belapurkar | G06F 21/41 726/14 |
| 2003/0159090 A1* | 8/2003 | Wray | G06F 21/56 714/38.1 |
| 2005/0251867 A1* | 11/2005 | Sastry | G06F 21/575 726/34 |
| 2006/0190996 A1* | 8/2006 | Korkishko | G06F 21/57 726/9 |
| 2008/0250502 A1* | 10/2008 | Sole | G06F 21/51 726/23 |
| 2010/0131084 A1* | 5/2010 | Van Camp | G06F 8/65 700/86 |
| 2010/0131732 A1 | 5/2010 | Busser et al. | |
| 2010/0318798 A1* | 12/2010 | Binding | G06F 21/54 713/170 |
| 2013/0263262 A1* | 10/2013 | Forristal | G06F 11/3024 726/22 |
| 2014/0122897 A1* | 5/2014 | Dodeja | G06F 21/00 713/189 |

FOREIGN PATENT DOCUMENTS

| | | |
|---|---|---|
| DE | 1020110772898 A | 6/2011 |
| EP | 1030237 A1 | 8/2000 |
| EP | 1056010 A1 | 11/2000 |
| WO | WO0018162 A1 | 3/2000 |

OTHER PUBLICATIONS

PCT International Search Report and Written Opinion of the International Searching Authority dated Dec. 10, 2013 for corresponding PCT/EP2013/066648.

Chinese Office Action for Chinese Patent Application No. 201380050676.5 mailed Sep. 2, 2016 with English translation.

\* cited by examiner

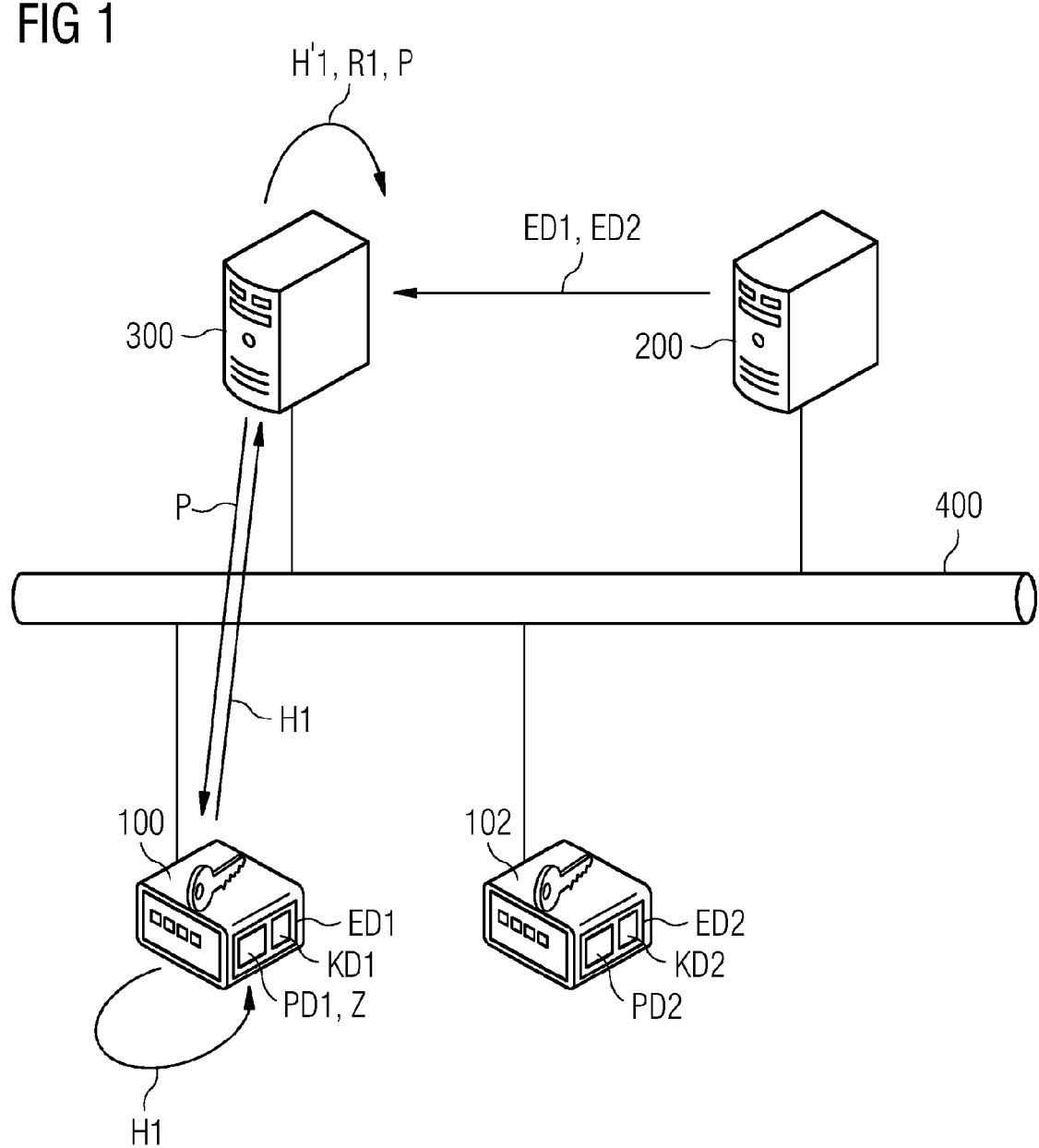

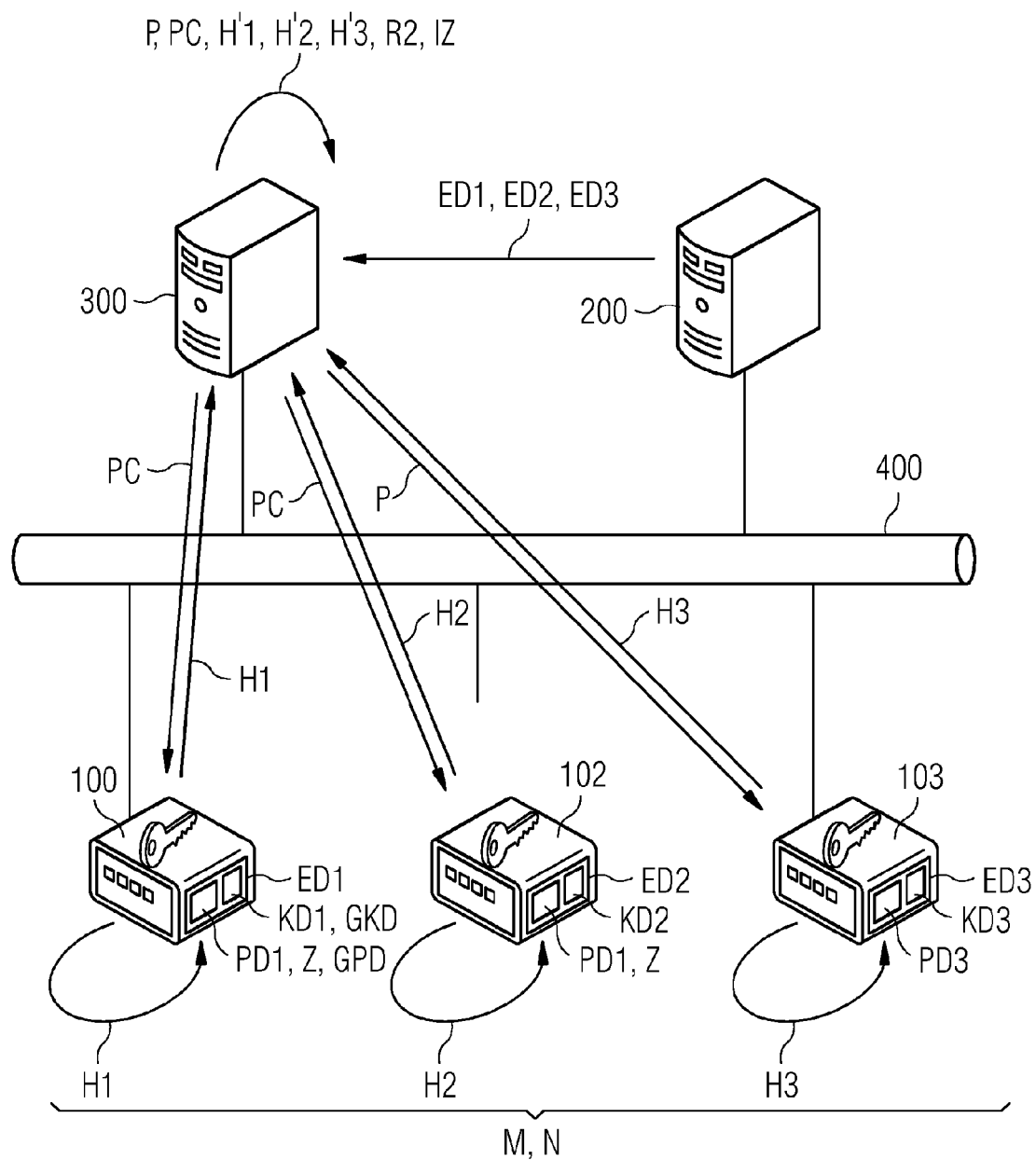

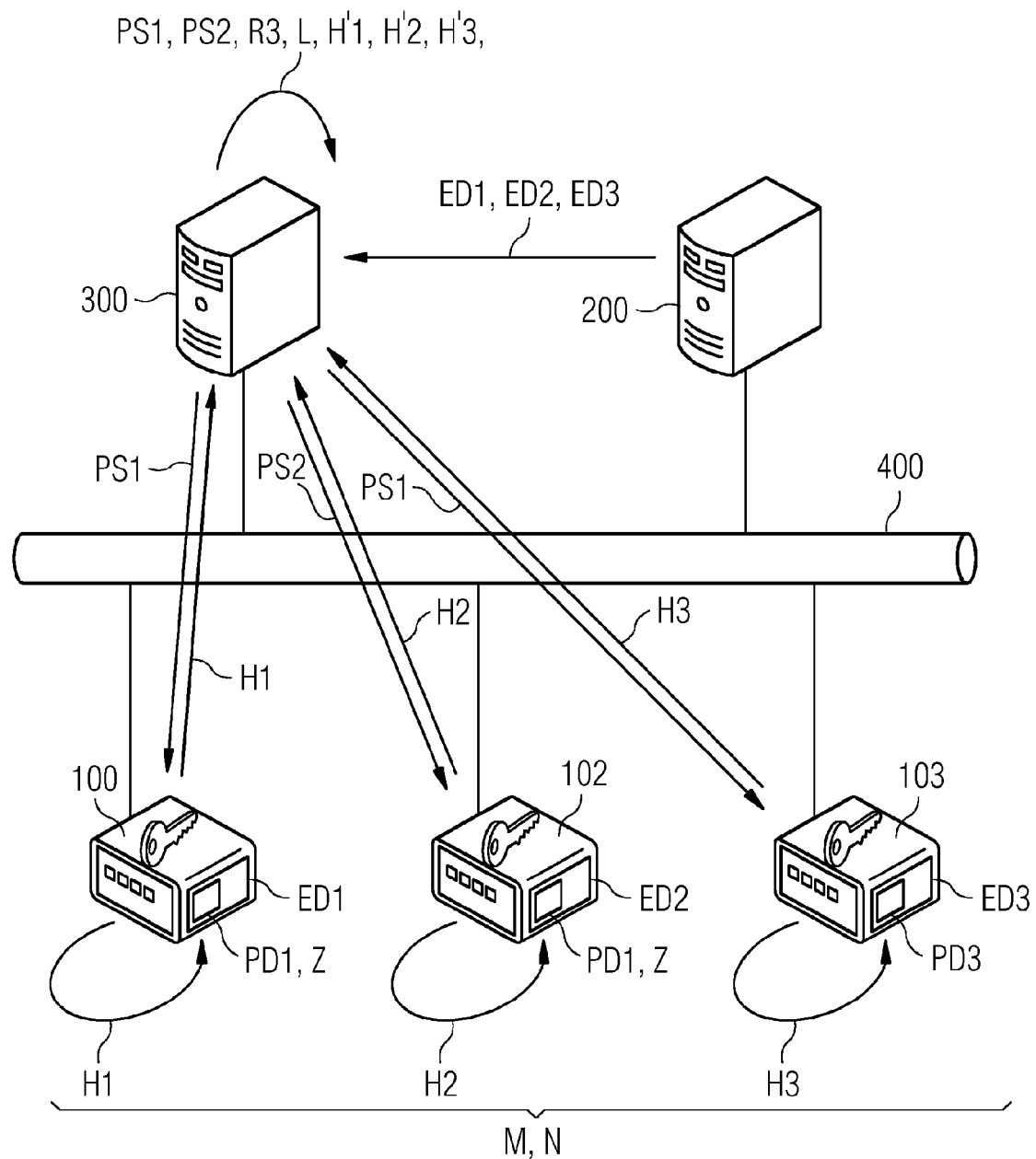

TESTING INTEGRITY OF PROPERTY DATA OF A DEVICE USING A TESTING DEVICE

The present patent document is a §371 nationalization of PCT Application Serial Number PCT/EP2013/066648, filed Aug. 8, 2013, designating the United States, which is hereby incorporated by reference, and this patent document also claims the benefit of DE 10 2012 217 743.4, filed on Sep. 28, 2012, which is also hereby incorporated by reference.

TECHNICAL FIELD

The embodiments relate to a method and a testing system for checking integrity of property data relating to a device by a testing device inside a network.

BACKGROUND

The inclusion of distributed measuring or control devices in the field of system automation is becoming increasingly important. Intelligent field devices for implementing intelligent power supply systems as well as devices with a control function inside automation systems or meters for billing for services used, such as communication, power, gas or water, are required in this case, for example.

In this case, safety-relevant data, (e.g., collected measurement data or switching commands), may be transmitted inside a network.

Manipulation of such devices is a serious problem for safe, reliable and economical operation of infrastructures, (for example, automation systems or intelligent energy supply networks). In this case, a manipulation may refer to an unauthorized modification of data on devices such as measuring or control devices. This manipulation includes, for example, changing the device properties or functionalities, for example replacing device software (e.g., firmware) or changing individual areas of the device software. In addition, configuration data relating to a device may be protected from unintentional and unauthorized modification.

A system and a method for detecting a state change in an automation system is disclosed in DE 10 2011 077 289.8. In this case, the integrity of the device software or of the configuration data is queried at regular intervals using a challenge-response protocol. If a fingerprint calculated by a device does not match the fingerprint expected by a monitoring device, the device has been changed in an unauthorized manner.

The patent specification DE 10 2007 034 525 B4 discloses a method that checks data stored in a predetermined memory area of devices by comparing a fingerprint locally calculated by a device with a fingerprint calculated by a testing entity.

For a large number of devices to be checked inside a network, a high computing power is expected of a testing entity, in particular, in the case of a parallel or virtually simultaneous check. At the same time, the check is supposed to provide that manipulation is discovered.

SUMMARY AND DESCRIPTION

The scope of the present invention is defined solely by the appended claims and is not affected to any degree by the statements within this summary. The present embodiments may obviate one or more of the drawbacks or limitations in the related art.

Against this background, the object is to provide a method and a testing system that make it possible for the integrity of a respective device to be checked by a testing entity in a simplified and tamperproof manner in the case of a large number of devices.

A method for checking integrity of property data relating to a device is provided, wherein the property data including a program data record and a configuration data record, by a testing device inside a network including the device, the testing device and at least one further device having further property data, the further property data including a further program data record and a further configuration data record. The method includes the following acts.

A station coupled at least to the testing device by the network provides the property data and the further property data. The testing device evaluates the property data and the further property data with regard to at least identity of the program data record and the further program data record, and allocates an identification on the basis of an evaluation result.

The testing device determines a parameter suitable for influencing a hash value and a test hash value of a hash function, the parameter being configured on the basis of the identification, and transmits the parameter to the device.

The device calculates the hash value on the basis of the hash function and a character string, the character string including the parameter and the property data and a sequence inside the character string being able to be predefined, and transmits the hash value to the testing device.

The testing device calculates the test hash value on the basis of the hash function and the character string, the character string including the parameter and the property data and a sequence inside the character string being able to be predefined.

The testing device confirms the integrity of the property data if the hash value matches the test hash value.

In the present application, the integrity of property data relating to a device refers to a state that does not imply manipulation of the device or its property data. This means, for example, that property data have not been changed or replaced during a check in comparison with an earlier check of the property data or correspond to an expected, stipulated or stored state.

The program data record of the property data may refer to the device software or firmware of a device or program data in the form of software. A configuration data record may include parameters such as network addresses, device identifiers or cryptographic key material and certificates as well as parameters that configure the functionality of the software; these are specific to a device.

The proposed method for checking a device inside a network makes it possible to take into account one or more further devices inside the network by virtue of the testing device evaluating both the property data relating to the device and the property data relating to the further devices and initiating the further checking method acts on the basis of the evaluation result. This makes it possible to check a device inside a network for manipulation, the prerequisites for efficiently checking a large number of devices being created by taking into account further devices inside the network. Manipulation is therefore detected promptly.

In this case, a device to be checked determines the hash value anew each time, for example, that is to say the hash value is calculated anew during each check using the parameter newly predefined for each check.

The testing device likewise calculates the test hash value for the device to be checked for each check. In this case, the testing device receives the property data such as, in particular, the program data record and the configuration data record from a station, which has the function of an engineering station inside an industrial automation system, for example, in a state that is up-to-date at the time of the check. In this case, the station may be part of the network and provides both the configuration data relating to the devices to be checked and the firmware and software versions installed on the devices.

The practice of checking devices in a system by a common test server that is optimized for checking a large number of devices in a parallel manner reduces the additional complexity caused by a plurality of individual testing systems for one device or a few devices.

According to one embodiment, the parameter at the start of the character string is transferred.

Therefore, it is not possible for the device to be checked to store an inner state of the hash method, which is calculated only on the basis of the program data record and the configuration data record, for the purpose of calculating the hash value, to then change the program data record and/or the configuration data record and to then again nevertheless calculate a correct hash value that matches the test hash value. This may be possible if the parameter at the end of the character string to be hashed were transferred.

Therefore, during a check, the device to be checked calculates the hash value on the basis of the parameter transferred for the current check and on the basis of the program data record and configuration data record currently on the device.

According to one embodiment, the parameter is in the form of a random number whose length is configured to the hash value.

In this case, the random number may be a number having a length of 128 bits to 512 bits (16 to 128 bytes). In this case, the length may correspond to the length of the hash value in the cryptographic hash method used. In this case, SHA-256, SHA-384 or SHA-512, in particular, is possible as the secure hash algorithm (SHA). If the determined hash value is shortened before being transmitted back because the amount of transmitted data is intended to be kept small and also because a shorter hash value already provides a sufficient security level, the random number may also be correspondingly short.

According to one embodiment, the parameter and/or the hash value is/are transmitted in a cryptographically secure manner.

If the parameter is transmitted in encrypted form, the risk of other devices, for which the information relating to the parameter, (e.g., the random number), is not intended, acquiring knowledge of the random number is reduced. Only a device having a suitable key may therefore acquire knowledge of the random number.

Signed transmission of the hash value from the device to be checked to the testing device provides the authenticity of the response from the device to be checked. The testing device may therefore use a public key to discern when the hash value is not transmitted by the device to be checked. This is useful, in particular, in order to detect or prevent denial-of-service attacks by further devices in the network.

As an alternative to the digital signature, the use of a keyed hash method is also conceivable, in which method a message authentication code (MAC) is calculated for the transmitted message both by the device to be checked and by the testing device using a secret key and the respectively calculated MAC matches.

Encrypted transmission of the hash value from the device to be checked to the testing device also prevents other devices in the network, which have received the same random number and may have the same program and configuration data record but no longer have the latter on account of manipulation and therefore may no longer themselves calculate the correct hash value, from simply eavesdropping the transmission of the hash value and then themselves transmitting this hash value to the testing device in order to deceive the testing device.

According to one development, an identical parameter is transmitted to the device and to the at least one further device.

During parallel checking of a large number of devices in particular, an identical parameter, for example a random number that is sent to all devices to be checked, simplifies the check since the computing complexity on the testing device is kept low.

According to one development, the testing device calculates an inner state on the basis of the hash function, the parameter and the program data record for the purpose of calculating the test hash value on the basis of the identification and stores the inner state.

The size of a program data record is greatly dependent on the device and may range from a few kB (e.g., in the case of an RFID tag) to several dozen MB (e.g., in the case of intelligent field devices or programmable logic controllers (PLCs)), for devices to be checked. In contrast, the size of the configuration data record may be considerably smaller. It may be in the range of at most a few percent of the program data record. The size of the parameter is negligibly small in comparison with that of the program data record.

Therefore, the program data record gives rise to the greatest computing complexity when calculating the test hash value.

A system may include relatively few different program data records since the devices in a series may all have the same firmware or software or there are at most a few different versions inside a system. The number of different program data records used in a system is therefore highly limited even if a very large number of devices are installed in the system.

If, when evaluating the property data and the further property data, the testing device now discerns that the respective program data records are identical, the testing device, when sending an identical parameter to the devices with an identical program data record, may calculate an inner state that jointly applies to devices with a common program data record. This reduces the computing complexity for the test server since, after calculating the inner state, it only respectively calculates the test hash value on the basis of the inner state and the configuration data record that is now individually calculated for each device.

According to another embodiment, the testing device transmits a unique parameter to the device and transmits a further unique parameter that differs therefrom to the at least one further device, the unique parameter and the further unique parameter being transmitted within a predefinable time window.

An advantage of this virtually simultaneous checking of a large number of devices to be checked with different parameters, in particular random numbers, is that forwarding attacks are made more difficult. A device installed in the system for a forwarding attack and to which the calculation of a hash value is diverted in order to thus conceal manipulation of the device to be checked now has an extremely high testing complexity: it now receives a different parameter for calculating the hash value from each manipulated device whose request to calculate the hash value is forwarded. For example, a forwarding attack may be detected by unexpectedly long response times of the checked devices.

According to one embodiment, the testing device transmits a unique parameter to the device and transmits a further unique parameter to the at least one further device on the basis of the identification.

Therefore, on devices with the same program data record, it is possible to select a parameter from a small number of different parameters, with the result that an identical parameter may not be assumed for devices with the same program data record. Although this increases the computing complexity for the testing device in comparison with an identical parameter for all devices in a system, it is therefore more difficult for manipulated devices to exchange information on the correct hash value. If, for example, a plurality of manipulated devices has together also stored all parts of an original program data record, they may create the correct hash value in cooperation. However, if they receive different parameters, this coordination is made more difficult and the computing complexity is increased since another hash value is now calculated for each parameter received by one of the devices.

According to one development, the integrity of the device is confirmed by the testing device if the device calculates and transmits the hash value within an individually predefinable response time window.

In the case of a forwarding attack, it is now virtually impossible for a plurality of manipulated devices to respond by transmitting the hash value within the predefined response time window since a device to which the calculation of the hash value is diverted has to perform an excessively large amount of computing in order to respond in the predefined time. In particular, if the checking method of a large number of devices is started simultaneously by the testing device, a forwarding attack may therefore be detected.

According to one development, the testing device calculates the test hash value before or after transmitting the unique parameter.

If the test hash value is calculated separately for each device, there is a high computing complexity for the testing device, with the result that it is advantageous to already calculate the test hash values before transmitting the parameter, with the result that the testing device may quickly check the correctness of the hash value immediately upon receiving the latter from a device to be checked and may trigger an alarm if necessary. It is likewise possible for the testing device to calculate the test hash value after receiving the hash value as a response from the device to be checked, but an incorrect hash value may be detected only later and an alarm may be triggered, if necessary, only later. If there is a warning or indications of the manipulation of a device or a group of devices, this method may nevertheless be selected in order to provide a high degree of reliability during checking.

A testing system for checking integrity of property data relating to a device is also provided, wherein the property data includes a program data record and a configuration data record, by a testing device inside a network including the device, the testing device and at least one further device having further property data, the further property data including a further program data record and a further configuration data record. The testing system includes a station for providing the property data and the further property data, the station being coupled at least to the testing device by the network.

The testing system also includes the testing device for evaluating the property data and the further property data with regard to at least identity of the program data record and the further program data record, allocating an identification on the basis of an evaluation result, determining a parameter suitable for influencing a hash value and a test hash value of a hash function, the parameter being configured on the basis of the identification, transmitting the parameter to the device, calculating the test hash value on the basis of the hash function and a character string, the character string including the parameter and the property data and a sequence inside the character string being able to be predefined, and confirming the integrity of the property data if the hash value matches the test hash value.

The testing system also includes the device for calculating the hash value on the basis of the hash function and a character string, the character string including the parameter and the property data and a sequence inside the character string being able to be predefined, and transmitting the hash value to the testing device.

According to one embodiment, the testing system also includes at least one further unit for use in one of the method acts according to the above-mentioned embodiments of the method.

According to another embodiment, the testing device and the station are in the form of a common unit. Therefore, there is no need to interchange data via the network such as, in particular, the often comprehensive property data.

BRIEF DESCRIPTION OF THE DRAWINGS

FIG. 1 depicts a schematic illustration of the checking method according to a first exemplary embodiment.

FIG. 2 depicts a schematic illustration of the checking method according to a second exemplary embodiment.

FIG. 3 depicts a schematic illustration of the checking method according to a third exemplary embodiment.

In the figures, identical or functionally identical elements have been provided with the same reference symbols unless indicated otherwise.

DETAILED DESCRIPTION

The method acts and components of the method are depicted in FIG. 1.

An automation system contains numerous devices such as measuring or control devices that need to be checked for manipulation in order to safely and reliably operate the system. In order to check a device 100, which is a robot controller of an industrial robot for example, it is proposed for a testing device 300, which is coupled to the device 100 via a network 400 of the automation system, to be provided with property data ED1 relating to the device 100 by a station 200 coupled at least to the testing device 300 via the network 400. The property data ED1 make it possible to uniquely identify the device 100, that is to say the robot controller. In this case, the station is in the form of an update server continuously provides the testing device 300 with a current version of the property data ED1. The testing device 300 is also provided with further property data ED2 relating to a further device 102 inside the system by the station 200.

The property data ED1 and further property data ED2 made available to the testing device 300 are now evaluated. The property data ED1 and the further property data ED2 include a program data record PD1 and a configuration data record KD1 and a further program data record PD2 and a further configuration data record KD2 relating to the further device 102. The program data record PD1 contains an indication of the firmware on the robot controller. The configuration data record contains a device identifier and parameters that have been predefined for the execution of process acts of the industrial robot.

The respective property data that are made available to the testing device 300 by the station 200, the update server in this case, are now evaluated with regard to at least identity of the respective program data records. An identification Z is allocated to a program data record relating to a device to be checked, the program data record PD1 relating to the device 100 in the described example, on the basis of an evaluation result. The identification Z of program data records for which identity has been determined is carried out in this case by the testing device 300 logically grouping property data made available to it, for example storing property data made available to it with provided property data having an identical program data record in a common memory area. Robot controllers in a common series with identical version numbers may therefore be logically combined by the testing device 300.

On the basis of this identification Z, the testing device 300 now determines a parameter P that, on the one hand, is transmitted to the device 100 for the purpose of calculating a hash value H1 by the device 100 and, on the other hand, is used by the testing device 300 to calculate a test hash value H'1. The calculation of the hash value H1 by the device 100 and the calculation of the test hash value H'1 by the testing device 300 are each carried out on the basis of a hash function and a character string. In this case, the character string includes the parameter P and the property data ED1, the character string respectively being hashed such that the parameter P is transferred first and the program data record PD1 and the configuration data record KD1 are then transferred.

In this case, the device 100 may calculate a correct hash value, which matches the test hash value H'1 calculated by the testing device 300, only when it carries out the calculation using the property data ED1 currently on the device 100 following a request to calculate the hash value H1—this is effected by transmitting the parameter P to the device 100. An inner state of the hash method on the basis of the property data ED1 therefore may not be meaningfully precalculated and stored. If a parameter P newly determined for each testing method, for example a random number, is concomitantly included in the calculation and is transferred at the beginning of the character string, originally unmanipulated property data ED1 may not be used to calculate an inner state of the hash method that may still provide a correct hash value even after the property data ED1 have been manipulated, as may be possible in a method in which the parameter P is at the end of the character string.

Inclusion of the further devices inside the system when determining the parameter P reduces the computing complexity for the testing device, as explained in more detail below using FIG. 2.

An exemplary embodiment is explained using three devices to be checked. In a similar manner to the situation described above, the station 200 provides property data, that is to say the property data ED1, the further property data ED2 and third property data ED3 in this case. The property data ED1 include the program data record PD1 and the configuration data record KD1, the further property data ED2 likewise include the program data record PD1, which is identical to the program data record PD1 from the device 100, and the further configuration data record KD2, and the third property data ED3 include a third program data record PD3 and a third configuration data record KD3. The testing device 300 now identifies the property data ED1 and the further property data ED2 since the evaluation of the respective property data has revealed the identity of the respective program data records.

An identical parameter PC is now transmitted to the device 100 and to the further device 102 on account of the identical program data records. If no identity of the third program data record PD3 with one of the other program data records relating to the devices to be checked has been determined for the third device 103, an arbitrary parameter P is transmitted to the third device 103. In a similar manner to the method described above, the device 100, the further device 102 and the third device 103 calculate the hash value H1, a further hash value H2 and a third hash value H3. The calculated hash values are respectively transmitted from the respective devices to the testing device 300.

The testing device 300 may now calculate a respective test hash value according to a simplified method. For the program data record PD1 transmitted to it, the testing device 300 now first of all calculates an inner state IZ that depends on the hash function, the respective parameter PC and the program data record PD1. This inner state IZ is stored and the test hash value H'1 is then calculated, the test hash value H'1 being calculated on the basis of the hash function, the inner state IZ and the configuration data record KD1.

The inner state IZ is likewise used to calculate the test hash value H'2 of the further device 102, with the result that the further configuration data record KD2 only needs to be hashed.

This method may be expanded to any desired numbers of devices, the inner state IZ is being calculated and stored for respectively transmitted program data. This combination of the calculation of the inner state is effected independently of the number of available devices. The more devices may be combined using this method, the greater the reduction in the computing complexity.

In the case of large numbers of devices, this method therefore constitutes a great simplification for the testing device 300, which shall be illustrated using the following numerical example.

A size of program data relating to a device, for example firmware or software, is greatly dependent on the device and may range from a few kB (for example for RFID tags) to several dozen MB (for example in the case of intelligent field devices or programmable logic controllers). For the numerical example, an average size of program data GPD of GPD=32 MB shall be assumed. It shall be assumed that a program data number M of different program data records, in particular different series, of M=10 exists inside a system.

An average size of configuration data GKD may be smaller than that of the program data and is GKD=0.1 MB in the example. A number of different devices, for example a number of 1000 devices inside a system, refers to a configuration data number N of N=1000.

For a checking method without use of an inner state IZ for devices to be checked with an identical program data record, the data volume G1 to be hashed for the testing device 300 is composed of: N·GPD+N·GKD=G1.

This corresponds to the case in which a hash value is calculated for each device in a system and the data volume G1 to be hashed, as a sum, is composed of the product of the configuration data number N and the average size of program data GPD and the product of the configuration data number N and the average size of configuration data GKD.

If the testing device 300 first of all calculates an inner state IZ only for each different program data record and then calculates the hash value using the configuration data, the following further data volume G2 to be hashed results: $M \cdot GPD + N \cdot GKD = G2$.

For the variant without use of the inner state IZ, this refers to, in the numerical example, a data volume G1 to be hashed of: $1000 \cdot 32$ MB $+ 1000 \cdot 0.1$ MB $= 32100$ MB.

In contrast, the further data volume G2 to be hashed, when using the inner state IZ, is only: $10 \cdot 32$ MB $+ 1000 \cdot 0.1$ MB $= 420$ MB.

In this case, the data volume to be hashed is respectively correlated with a computing complexity that, in the case of calculating an inner state IZ, is likewise lower in a manner corresponding to the smaller data volume to be hashed, with the result that devices are checked more quickly.

For an increased security requirement, in a further exemplary embodiment, FIG. 3 is used to explain how the computing complexity may nevertheless be kept low for a testing device 300. In the case of identification Z of property data having identical program data records, partially different parameters are transmitted in this case to the devices having identified property data. FIG. 3 illustrates how a unique parameter PS1 is transmitted to a device 100 having property data ED1 and a program data record PD1, a further unique parameter PS2 being transmitted to a further device 102 having further property data ED2 and a program data record PD1 identical to the program data record PD1 relating to the device 100. An arbitrary third unique parameter PS3 that may match one of the other transmitted parameters may be transmitted for a third device 103 having third property data ED3 and a third program data record PD3 that does not match one of the program data records relating to the other devices. In this case, a few random numbers from a small number of random numbers L, for example, are available to the testing device 300 when selecting a unique parameter to be transmitted.

The computing complexity for the testing device according to this method is increased since an inner state now is calculated for each possible random number for each program data record occurring in the system. A third data volume G3 to be hashed results: $L \cdot M \cdot GPD + N \cdot GKD = G3$.

In the numerical example selected above, a third data volume G3 to be hashed of: $10 \cdot 10 \cdot 32$ MB $+ 1000 \cdot 0.1$ MB $= 3300$ MB, results when selecting the random number from L=10 different random numbers.

This is a method with increased security since an agreement between manipulated devices, which exchange information in order to determine a correct hash value, is now made more difficult. For example, a plurality of manipulated devices may together reconstruct an original program data record. Although the program data record has been respectively changed for each device, it is nevertheless possible to calculate a correct hash value in cooperation. If, however, different random numbers are transmitted to the devices, this coordination is made more difficult. Each device now already calculates an individually correct hash value on account of the random number that may not be assumed to be the same, in which case the inner state IZ also already is individually correctly determined, in particular on the basis of the random number and the program data record.

In the case of a large amount of available computing capacity of a testing entity, it is also conceivable to transmit a different parameter P to all devices to be checked inside a system. This method may be selected by the testing device 300, in particular, if there is sufficient time to calculate the test hash values or a general check with very high security requirements is pending. The parameters P specific to each device to be checked are then transmitted within a predefinable time window.

Integrity of the property data relating to a device to be checked is confirmed only if a response in the form of the hash value determined and transmitted by the device to be checked is given within a predefined response time window.

In this case, the testing device may take account of the fact that some devices to be checked that have an increased utilization of their processor, (e.g., on account of extensive functions or a lower available computing capacity), require an accordingly longer response time and may either adapt the response time window in a device-specific manner or may accordingly start a checking request in the form of a transmitted parameter earlier for these devices. For the testing device 300, this method refers to an enormously high computing complexity, with the result that it is advantageous to calculate test hash values to be calculated in advance, that is to say before transmitting the parameters.

Forwarding attacks inside a system are made more difficult by this method since a virtually simultaneous check of all devices inside the system is started and each device responds within a predefined response time window.

The presented exemplary embodiments may be combined with one another in an advantageous manner: for this purpose, the testing device, as a standard setting, may select the method in which a test hash value calculation is combined for devices with identical program data records, an identical parameter PC is transmitted to these devices and an inner state IZ is calculated, with the result that the computing complexity for the testing device is kept low even in the case of a large number of devices to be checked in a parallel manner. If manipulation of a group of devices with identical program data records is suspected, it is possible to deliberately resort to the method in which different parameters PS1, PS2 are transmitted to devices having identical program data records. This may be advantageous even when a new group of devices is installed inside the system.

Different security levels for different security requirements may be complied with inside a system by varying the number of parameters used, in particular the random numbers used. Unintentional software changes, (e.g., caused by memory errors, or discrepancies between the assumed software or configuration stored in the engineering station and the actual software or configuration in the device that are produced by in-situ configuration by a service engineer and a lack of comparison with the engineering station), are also detected. The combination of the different methods presented allows an efficient check in systems having a large number of installed devices.

The units of the device 100, further device 102, third device 103, testing device 300 and station 200 and the further unit may be implemented and executed using software, hardware or a combination of software and hardware.

The acts implemented by the units may be stored as program code on a storage medium, in particular a hard disk, a CD-ROM or a memory module, the individual instructions of the program code being read and processed by at least one computing unit including a processor. The processor is connected to the storage medium via a bus for the purpose of interchanging data.

Furthermore, an input/output unit may be connected via the bus, the input/output unit being able to be used to receive and/or transmit data, for example property data, a parameter, a hash value or a test hash value.

The described embodiments and developments may be freely combined with one another.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method for checking integrity of property data relating to a plurality of devices, the method comprising:
    providing the property data from a station to a testing device via a network, the property data for each device of the plurality of devices comprising a program data record and a configuration data record, wherein the program data record comprises software, firmware, or program data in a form of software, or a combination thereof, and wherein the configuration data comprises a network address, device identifier, cryptographic key material and certificates, or a combination thereof;
    evaluating the property data by the testing device with regard to at least identity of the program data record to provide an evaluation result;
    determining a same parameter for each device of the plurality of devices, wherein the parameter is suitable for influencing a hash value and a test hash value of a hash function, by the testing device, the parameter being configured based on the evaluation result;
    calculating, by the testing device, an inner state based on the hash function, the parameter, and the program data record, wherein the inner state is a sequence of a character string between a start of the character string and an end of the character string, and wherein the character string comprises the parameter and the property data;
    transmitting, by the testing device, the parameter to each respective device of the plurality of devices;
    calculating the hash value, by each device, based on the hash function and the character string;
    transmitting the hash value to the testing device;
    calculating the test hash value, by the testing device, based on the hash function and the character string, wherein the inner state is used in the calculating of the test hash value; and
    confirming the integrity of the property data, by the testing device, when the hash value matches the test hash value, or
    triggering an alarm when the hash value does not match the test hash value.

2. The method of claim 1, wherein the parameter at a start of the character string is transmitted.

3. The method of claim 1, wherein the parameter comprises a random number whose length is configured to the hash value.

4. The method of claim 1, wherein the parameter, the hash value, or the parameter and the hash value is/are transmitted in a cryptographically secure manner.

5. The method of claim 1, wherein the integrity of at least one device of the plurality of devices is confirmed when the at least one device calculates and transmits the hash value within an individually predefinable response time window.

6. The method of claim 1, wherein the station is an update server.

* * * * *